United States Patent
Lang et al.

(10) Patent No.: US 12,078,983 B2
(45) Date of Patent: Sep. 3, 2024

(54) PRODUCTION MACHINE COMPRISING A CONTROL PROGRAMME

(71) Applicant: KIEFEL GMBH, Freilassing (DE)

(72) Inventors: Christian Lang, Haigermoos (AT); Michael Schörghofer, Bad Dürrnberg (AT); Peter Knoll, Ainring (DE); Andreas Ainz, Plainfeld (AT); Horst Hradetz, Ainring/Mitterfelden (DE)

(73) Assignee: KIEFEL GMBH, Freilassing (DE)

( * ) Notice: Subject to any disclaimer, the term of this patent is extended or adjusted under 35 U.S.C. 154(b) by 395 days.

(21) Appl. No.: 17/622,446

(22) PCT Filed: Jun. 22, 2020

(86) PCT No.: PCT/DE2020/000138
§ 371 (c)(1),
(2) Date: Dec. 23, 2021

(87) PCT Pub. No.: WO2020/259730
PCT Pub. Date: Dec. 30, 2020

(65) Prior Publication Data
US 2022/0253049 A1    Aug. 11, 2022

(30) Foreign Application Priority Data

Jun. 25, 2019 (DE) .................... 10 2019 117 092.3

(51) Int. Cl.
*G05B 19/41* (2006.01)
*B29C 51/46* (2006.01)
(Continued)

(52) U.S. Cl.
CPC ........ *G05B 19/41885* (2013.01); *B29C 51/46* (2013.01); *G05B 19/409* (2013.01); *B29C 2037/906* (2013.01)

(58) Field of Classification Search
CPC ............ G05B 19/41885; G05B 19/409; G05B 2219/32339; B29C 51/46; B29C 2037/906; B29C 49/78
See application file for complete search history.

(56) References Cited

U.S. PATENT DOCUMENTS 5,470,218 A * 11/1995 Hillman ................. B29C 49/78
425/149
7,296,956 B2 * 11/2007 Dirnfeldner ....... B23Q 11/0891
451/6

(Continued)

FOREIGN PATENT DOCUMENTS

| CN | 1137829 A * 12/1996 | ............. G05B 19/42 |
| CN | 101122793 A * 2/2008 | ............. Y02P 90/02 |

(Continued)

OTHER PUBLICATIONS

Gorecky et al., "Human-Machine-Interaction in the Industry 4.0 Era", 2014, IEEE. (Year: 2014).*

(Continued)

*Primary Examiner* — Mohammad Ali
*Assistant Examiner* — Kelvin Booker
(74) *Attorney, Agent, or Firm* — Tarolli, Sundheim, Covell & Tummino LLP (57) ABSTRACT

The invention relates to a production machine (1) having a control program (4) for visualization of machine components (2) and a method (100) of optimizing process parameters for the production machine having such a control program, as well as a data carrier having such a control program, the control program comprising an interactive user interface embodied as a visualization unit (5) and being adapted to visualize, on the visualization unit, at least one of the machine components in their functions during production in one presentation for each of these machine components and to provide corresponding switch panels (51) for (Continued)

the input of process parameters relating to the respective visualized machine component, the presentation comprising at least one parameter-time diagram (52) with motion curves (53) for components (21) of the respective machine component, wherein at least one of the motion curves being subdivided into different suitably visualized motion sections (53a, 53b, 53c) for each of which the process parameter defining the process for this motion section is visualized and can be varied by means of the provided switch panels.

22 Claims, 5 Drawing Sheets

(51) Int. Cl.
  *G05B 19/40* (2006.01)
  *G05B 19/409* (2006.01)
  *G05B 19/418* (2006.01)
  *B29C 37/00* (2006.01)

(56) References Cited

U.S. PATENT DOCUMENTS

| | | | | |
|---|---|---|---|---|
| 8,670,965 | B2 * | 3/2014 | Russell | G06F 30/331 703/7 |
| 9,165,096 | B2 | 10/2015 | Russell | |
| 2001/0049568 | A1 * | 12/2001 | Focke | A61F 13/0276 700/114 |
| 2008/0228315 | A1 | 9/2008 | Wendner | |
| 2013/0066456 | A1 | 3/2013 | Russell | |
| 2013/0066620 | A1 * | 3/2013 | Russell | G05B 19/409 703/17 |
| 2014/0142901 | A1 * | 5/2014 | Russell | G06F 30/17 703/1 |
| 2014/0142913 | A1 * | 5/2014 | Russell | G05B 19/05 703/7 |
| 2014/0249780 | A1 * | 9/2014 | Russell | G05B 19/05 703/2 |
| 2015/0094841 | A1 * | 4/2015 | Russell | G06F 30/23 700/126 |
| 2015/0095005 | A1 * | 4/2015 | Russell | G06F 30/3308 703/7 |
| 2015/0169809 | A1 * | 6/2015 | Russell | G06F 30/20 703/7 |
| 2015/0169810 | A1 * | 6/2015 | Russell | G05B 17/02 703/7 |
| 2015/0343733 | A1 * | 12/2015 | Lorenz | G05B 19/402 703/2 |
| 2017/0203515 | A1 * | 7/2017 | Bennett | B29C 64/393 |
| 2019/0121338 | A1 * | 4/2019 | Cella | H04B 17/23 |
| 2019/0324439 | A1 * | 10/2019 | Cella | G05B 13/028 |
| 2019/0324444 | A1 * | 10/2019 | Cella | G05B 23/0291 |
| 2019/0339688 | A1 * | 11/2019 | Cella | H04L 1/18 |
| 2020/0026397 | A1 * | 1/2020 | Wohlstadter | G06F 3/04845 |
| 2020/0103894 | A1 * | 4/2020 | Cella | G06N 3/045 |
| 2020/0133257 | A1 * | 4/2020 | Cella | G05B 19/4183 |
| 2020/0225655 | A1 * | 7/2020 | Cella | G05B 19/41875 |
| 2020/0391422 | A1 * | 12/2020 | Giessauf | B29C 45/768 |
| 2021/0200393 | A1 * | 7/2021 | Wohlstadter | G06F 3/0485 |
| 2021/0240312 | A1 * | 8/2021 | Wohlstadter | G16H 10/40 |
| 2023/0045713 | A1 * | 2/2023 | Wohlstadter | G01N 35/00722 |

FOREIGN PATENT DOCUMENTS

| | | | |
|---|---|---|---|
| CN | 101836169 A | 9/2010 | |
| CN | 103038720 A | 4/2013 | |
| DE | 4330218 A1 | 3/1995 | |
| GB | 2163928 A * | 3/1986 | G05B 19/405 |
| WO | WO-2005067591 A2 * | 7/2005 | B29C 49/78 |
| WO | 2007/045073 A1 | 4/2007 | |
| WO | 2012/038491 A1 | 3/2012 | |

OTHER PUBLICATIONS

International Search Report and Written Opinion for corresponding PCT Patent Application No. PCT/DE2020/000138 dated Oct. 6, 2020.
CN Office Action for corresponding CN Application No. 202080042995.1, dated Dec. 14, 2023, 15 pgs.
Office Action for corresponding DE 10 2019 117 092.3 issued Apr. 21, 2022.

* cited by examiner

PRODUCTION MACHINE COMPRISING A CONTROL PROGRAMME

RELATED APPLICATIONS

The present invention is a U.S. National Stage under 35 USC 371 patent application, claiming priority to Serial No. PCT/DE2020/000138, filed on Jun. 22, 2020; which claims priority from German Patent Application No. 10 2019 117 092.3 filed on Jun. 25, 2019; the entirety of both are hereby incorporated herein by reference.

FIELD OF THE INVENTION

The invention relates to a production machine having a control program for visualization of machine components and to a method of optimizing process parameters for a production machine having such a control program, as well as to a data carrier with such a control program.

BACKGROUND OF THE INVENTION

Production machines with several machine components are used in many areas of manufacturing. In plastics processing, for example, blow moulding machines and thermoforming machines are used. In thermoforming machines according to the state of the art which can accommodate various constructional shapes of tools for producing mouldings of different shapes, different form programs must be employed for producing different mouldings. For a good quality in the production of various mouldings, normally different process parameter sets are required which must be entered in the form programs. Here, it may be necessary to adapt even a process parameter set actually known for the moulding to the respective production and machine situation. When during optimization of the manufacturing process, the operator changes machine parameters, it is desirable that a visualization indicates the basic timing process of the machine so that the operator needs less effort to fit in the effects of his actions in the current timing process of the machine.

In the state of the art, control programs can be found which, in addition to the input fields, show a schematic presentation of individual machine components in order to better represent the respective process step to the operator. Sometimes, the machine presentations are supplemented by motion curves of the machine components. Nevertheless, from such a presentation alone, the operator cannot deduce an optimum parameter set, but must also rely on his personal experience.

It is therefore desirable to provide a more objective basis for optimization of the process parameter set and to make a process visualization available to the user by means of which he can arrive at a process parameter set better fit for the production, independently of his experience.

SUMMARY OF THE INVENTION

The invention is based on the task of providing a control program for production machines by means of which optimization of the process parameter set can take place on a more objective basis and a process visualization is made available to the user by means of which he can arrive at a process parameter set better fit for the production, independently of his experience.

The object of the invention is achieved by a production machine for plastics processing, comprising several machine components and a machine control for controlling the production machine, comprising a control program with an interactive user interface in the form of a visualization unit, the control program being adapted to visualize on the visualization unit at least one, preferably all, of the machine components in their function during production, using one presentation for each of these machine components, and to provide respective switch panels for the input of process parameters with regard to the respective visualized machine component, the presentation comprising at least one parameter-time diagram with motion curves for one or more components of the respective machine component, at least one of the motion curves being divided into various motion sections with different suitability, for each of which the process parameter determining this process is visually displayed and can be varied by means of the provided switch panels.

Production machines for plastics processing can be, for instance, blow moulding machines or thermoforming machines. Blow moulding machines produce a film tubing from heated plastic material. Thermoforming machines are used for producing deep-drawn mouldings, comprising a transport unit for a thermoplastic film web and a moulding station for moulding the mouldings from the previously heated film web. Such machines are characterized in that they comprise a plurality of individual machine components which must suitably work together since a single film tubing or a single film web, respectively, are guided through the entire production facility and consequently the machine components must be well matched in effect and cycle time so as to achieve a good overall process. Machine components for a thermoforming machine comprise, for instance, the transport unit for film feed from a film roll, a preheating station for preheating the film web, a heating station for heating the film web up to the process temperature, a moulding station for moulding the product from the film web, a cutting station for cutting the moulded products out of the film web, a stacking station for stacking the finished products and a recovery station for the film web which has not been processed.

The machine control can be arranged on the production machine or separately from the production machine, the machine control being connected to the respective machine components via suitable data lines such that the process parameter inputs can be translated into corresponding machine settings. The machine control additionally comprises a processor on which the control program can be installed and executed as well as a data memory for storing process parameters, or is at least connected to such a memory. The data lines can be embodied as data cables or wireless. The machine control can also be implemented, for example, as a cloud solution which is connected to the production machine via W-LAN or an Internet connection.

The visualization unit can be any unit suitable for this purpose, for instance a touchscreen. Via the visualization unit, the operator obtains a process visualization by means of the control program with which he can arrive more quickly at an optimum process parameter set for production, independently of his experience. The process parameter set consists of the process settings which must be performed to be able to carry through a production on the production machine. The individual process parameter sets can be stored as formulas for the manufacturing of specific products in the machine control or on an external storage medium and can be loaded into the control program. The switch panels can be offered to the user as software fields for the input of parameters via the visualization unit.

A parameter-time diagram is a two-dimensional presentation in an xy-diagram, with the time normally being shown on the horizontal coordinate and the correlated parameter, for instance a path or a path distance, on the vertical coordinate. In case of a path or a path distance, the parameter-time diagram is called path-time diagram. The motion curves presented in the parameter-time diagram show the respective movements of the components of the respective machine components by means of a parameter as a function of time. The term "motion curves" merely indicates that the parameter characterizes the motion of the components. The parameter does not necessarily have to be the path or the path distance covered by the components during movement. In one embodiment, however, the parameter-time diagram is a path-time diagram since movements can well be presented as position changes over time and thus as paths or path distances over time. Components of the machine components are called subcomponents of the machine components. For example, if the production machine is a thermoforming machine, the machine component "moulding station" may comprise, for instance, the components upper die and lower die between which the film web is tensioned for the moulding process, and possibly prestretching dies which prestretch the film during the moulding process. Since movements of the components, and thus the motion curves, can for instance comprise an acceleration path, a path at constant speed and a braking path, these paths can be divided into different motion paths of the motion curve which are visualized differently for more clarity. By visualization of the parameter determining the process on the individual motion paths, the operator can adapt, in a targeted manner, the process parameters with the strongest influence on the motion curve in this motion section so that, for instance, the processing time for this machine position can be shortened if this machine component determines the overall processing time in the production machine. In particular, by means of this visualized input guide provided by the control program, process settings are avoided which have no substantial or even a detrimental influence on the process, its quality and/or its velocity.

Suitable visualization of the motion sections can be performed in various ways, for instance by adding the process-determining parameter to or into the respective motion section, for instance as a symbol or number of the respective switch panels for inputting this parameter, in plain language or by highlighting the motion portions, for instance, if the motion curves are presented as lines in the parameter-time diagram in the visualization unit, by means of different line thicknesses, different lightnesses of the lines, different line shapes or line formats, different colours, different flashing patterns of the lines, different colours or markings of the area under the lines etc., or a combination of two or more of the above possibilities in the various motion sections.

Thus, with the present invention, a production machine or a control program for the production machines is made available by means of which optimization of the process parameter set can be performed starting from a more objective basis, and a process visualization is provided to the user with which he can arrive more quickly at a process parameter set optimum for production independently of his experience.

In one embodiment, all motion curves of the parameter-time diagram are divided into various motion portions suitably visualized. Thus, the operator obtains, for all components of the respective machine component, corresponding to the motion curves, detailed information on which process parameters define the process at which point in time of the movement or in which motion area; and therefore he needs less time to optimize the process parameter set to achieve the desired effect, without getting lost in modifying process parameters which are of less importance, or without moving towards a setting undesirable for the process even though adjusting the correct parameters.

In another embodiment, the motion sections have a length dependent on the process parameters input via the switch panels, with the control program adapting the length of the motion portions and the visualized process-defining parameter to the respective inputs. For instance, the settings for process parameters like final velocity and acceleration in the movement of the upper and lower dies in the moulding station can cause the motion sections previously dominated by the final velocity to disappear at a defined selected acceleration. For instance, in case of a fixed motion path, defined by the maximum motion paths in the moulding station, a selected low acceleration with predefined high final velocity could cause the motion path with leading final velocity to disappear because the final velocity is not even reached via the available motion path with the selected low acceleration. These conditions would not be visible to the operator from the mere motion curves without the visualization according to the invention, which uses different visualizations for the various motion sections. By making the motion section with dominating final velocity in this example disappear and the motion section with dominating acceleration grow in length such as to fill the entire motion path, the operator is induced by the instruction of the control program to modify the input values for acceleration and final velocity, in this case, for instance, the acceleration values such that there is again a motion section with a specific length in the motion curve which is dominated by the final velocity. In this manner, the cycle times of the machine component can also be shortened since the correct process parameters for a manipulation are indicated to the operator.

In another embodiment, the motion curves are subdivided into the different motion sections by means of different colours. In this way, different motion sections can be displayed in a very instructive manner. By using various colours, mixing up or overviewing of smaller motion sections on the motion curve can be particularly well avoided. For the indication, for instance, complementary colours can be used for a particularly clear distinction of adjacent motion sections.

In another embodiment, the switch panels of the process-defining process parameters are indicated by the same colours as the respective motion sections where these process parameters define the process. This clearly shows to the operator which process parameters he has to change in order to influence the motion curve, and which switch panel he has to use for this purpose. Thus, the operator can be prevented from mixing up the switch panels to set the desired process parameter, even if he has already recognized the parameter he has to change. This helps to prevent invalid inputs into the control program. Marking the switch panels with the same colour as the motion sections of the motion curves may take place, for instance, by labelling the respective switch panels on one side with a coloured bar, enclosing them in a coloured frame or partially or completely highlighting them with the respective colour.

In another embodiment, the respective motion section of the motion curve is highlighted during input of the process-defining parameter by means of the respective switch panels. This visualization of input, which is provided by the control program, enables the operator to immediately check whether with the selected switch panel, he has indeed modified the targeted motion section or erroneously a different motion section. In this way, optimization of the process parameters is accelerated and made safer to use. Highlighting of the motion section can take place, for instance, by increasing the brightness or broadening the line thickness in this area of the motion curve.

In another embodiment, the indication is a multiple indication which comprises, in addition to the parameter-time diagram, a visualization of the components of this machine component which correlates with the motion curves. By visualization of the actual motion path of the components already displayed as motion curves, the operator obtains important additional information which he can use in addition to the information from the parameter-time diagram. In a moulding station, for instance, approaching and partial immersion of the upper die in the lower die can be controlled very plastically by means of a diagram, which may possibly not become as clear from the two-dimensional parameter-time diagram. Also, from the display of the machine component, the operator receives direct information on which process is being visualized for him.

In another embodiment, the presentation of the components of the machine component is a three-dimensional perspective presentation. In this manner, the operator is given a clear impression of the machine component. The perspective view allows a complex arrangement of the components, some of which may be covered in a two-dimensional presentation by other components arranged in the front.

In another embodiment, only those components are shown in the presentation of the components of the machine component which move inside the parameter-time diagram according to the motion curves. This simplifies a correlation of the motion curves with the presentation which in this manner becomes clearer for the operator. Also, stationary components have no motion curves, such that the presentation of moving components only on the visualization display helps to avoid false interpretations on the part of the operator.

In another embodiment, the presentation of the components of the machine components by the control program is arranged directly adjacent to the parameter-time diagram in the visualization unit. This increases clarity of the presentation of the visualized machine component and allows a direct correlation of the motion curves with the displayed components of the machine component.

In a further embodiment, the switch panels for inputting process parameters with an influence on a specific motion curve are arranged by the control program separately from the other switch panels with influence on the other motion curves on the visualization unit via the control program. This helps to avoid invalid inputs due to similar labeling of the switch panels of different motion curves. If, for instance, some motion sections of the motion curve 1 are shown in green and other motion sections of the motion curve are shown in green or a similar colour as well, and if the corresponding switch panels contain correspondingly similar green labeling, the operator could, if the switch panels for the motion curves 1 and 2 are not sufficiently separated in space, perform the input intended for the motion section of the motion curve 1 in the switch panels of motion curve 2. An invalid input of this kind is avoided due to separate arrangement of the switch panels on the visualization unit.

In another embodiment, the switch panels with influence on specific motion curves are arranged in one or more areas on the visualization unit horizontally next to the parameter-time diagram, whereas switch panels with a general influence on the motion curves are arranged on the visualization unit above and/or below the parameter-time diagram. In this manner, operation is intuitively further improved, in particular by spatial separation between parameter inputs with general effects and switch panels with a direct influence on a specific motion curve.

In yet another embodiment, the control program for each visualized machine component provides a separate visualization page on the visualization unit, suitable switch panels being provided for changing between individual visualization pages. This enhances clarity of the presentation on the visualization display, reducing the risk of invalid inputs.

In another embodiment, the control program allows a tracing of the motion curves of the parameter-time diagram on the visualization unit, the tracing being correlated with the corresponding presentation in motion of the components of the machine component in their respective positions at any time in the parameter-time diagram. The animated course of the movements of the components of the presented machine components provides the operator with a very good possibility of controlling whether the process parameter are adequately set. The shown course in the respective machine component offers further insight into the process in addition to the indication of the process-defining parameter. By means of the presentation of the moving components of the machine component, a necessity of altering other process parameters below the process-defining parameters may become visible.

In yet another embodiment, the control program is configured so that the tracing may be suitably interrupted and continued by the operator at any point in time on the parameter-time diagram, with the moving presentation of the components stopping at the position of the point in time when the tracing was interrupted, and correspondingly continuing when tracing starting from this position continues. Stopping at a specific position allows visual detailed control of the correctness of machine positions at any point in time on the motion curve. Tracing can be stopped and/or re-continued, for instance, by means of a stop button or by hitting the motion curve or the parameter-time diagram etc. In a preferred embodiment, the control program provides a slider for this purpose on the visualization unit, by means of which the tracing of the parameter-time diagram can be stopped, started, wound forward or rewound and/or be performed in slow motion or in single steps with a respective correlating presentation of the components.

In another embodiment, the control program is embodied to calculate from the motion curves for the individual machine components a flow chart for the entire production machine and to display it on the visualization unit, preferably in the form of a bar graph in separate lines allocated to the respective machine components. Here, for instance the slowest machine component can be marked. If the overall cycle time of the production machine is to be shortened, the throughput of the slowest machine component must be optimized. This can be done with the visualization according to the invention.

In another embodiment, the control program is configured to display on at least one of the separate visualization pages switch tabs allocated to the individual components of the machine component visualized by means of the visualization page, by means of which additionally to the presentation of the component allocated to the respective switch tab, optionally a further component can be displayed in the parameter-time diagram and/or in the presentation of the components as an additional motion curve.

In yet a further embodiment, the control program is configured such that the visualization of the machine component functions in production and the input of process parameters into the respective switch panels can be performed without real operation of the production machine. Thus, the process in the production machine can be set "offline" and optimized such that the real start of production can take place with optimized process parameters.

The invention further relates to a method of optimizing process parameters for a production machine, comprising several machine components and one machine control for controlling the production machine, comprising a control program with an interactive user interface embodied as a visualization unit, preferably a touchscreen, comprising the following steps:

visualizing of the functions of at least one, preferably all, of the machine components in production in multiple presentation for each of these machine components on the visualization unit and providing corresponding switch panels for the input of process parameters relating to the respectively visualized machine component by the control program, the multiple presentation comprising at least one parameter-time diagram with motion curves of components of the respective machine component and a correlating presentation of the components of this machine component;

calculating the motion curves by means of the control program, based on the process parameters for the respective machine components which have been entered via the switch panels or are already present in the control program;

subdividing at least one of the motion curves into various suitably visualized motion sections by means of the control program;

visualizing of the process-defining process parameter for the respective motion section by means of the control program;

varying the process parameters via the switch panels on the basis of the visualized process-defining process parameter for the respective motion sections;

adapting the respective motion curves on the basis of the varied process parameters by means of the control program, including visualizing of the process-defining parameter for the respective motion section by means of the control program; and repeating the above steps for optimization of the process parameters for the production machine.

With the method according to the invention, optimization of the process parameter set for the production machine is placed on a more objective basis and a process visualization is made available to the user by means of which he can achieve a process parameter set optimum for production in less time, independently of his experience.

In one embodiment of the method, the motion sections have a length dependent on the process parameters input via the switch panels, and the control program adapts the length of the motion sections and the respective process-defining process parameter to the corresponding inputs.

In another embodiment, the method comprises the further step of marking the switch panels of the respective process-defining process parameters with the same colours as the corresponding motion sections where these process parameters define the process, the motion curves being subdivided into the various motion sections by means of different colours.

In another embodiment, the method comprises the additional step of tracing the motion curves of the parameter-time diagram on the visualization unit in correlation with the correspondingly moving presentation of the components of the machine component in their respective positions at any point in time in the parameter-time diagram. The presented course in the respective machine component offers additional insight into the process plus the indication of the process-defining parameter. By means of the presentation of the moving components of the machine component, alteration requirements for other process parameters below the process-defining parameters can become visible.

In another embodiment, the method comprises the following additional steps:

calculating a flowchart for the entire production machine from the motion curves of the individual machine components; and presenting the flowchart on the visualization unit, preferably as a bar graph in separated lines allocated to the respective machine components.

In another embodiment, the method of optimizing the process parameters for the production machine by visualizing the functions of the machine components in production and inputting process parameters into the respective switch panels is performed outside real operation of the production machine.

The invention further relates to a data carrier with a control program stored thereon, suitable for performing the method according to the invention or for controlling a production machine according to the invention.

It is understood that features of the solutions described above or in the Claims can also be combined, if desired, for cumulative achievement of the achievable advantages and effects.

SHORT DESCRIPTION OF FIGURES

In addition, other features, effects and advantages of the present invention are explained using the attached figure and the following specification. Components in the individual figures which correspond to each other at least substantially in terms of their function are indicated by the same reference numbers, the components not necessarily being referenced and explained in all figures.

The drawings show as follows.

EXAMPLES OF EMBODIMENTS

Figure 1:
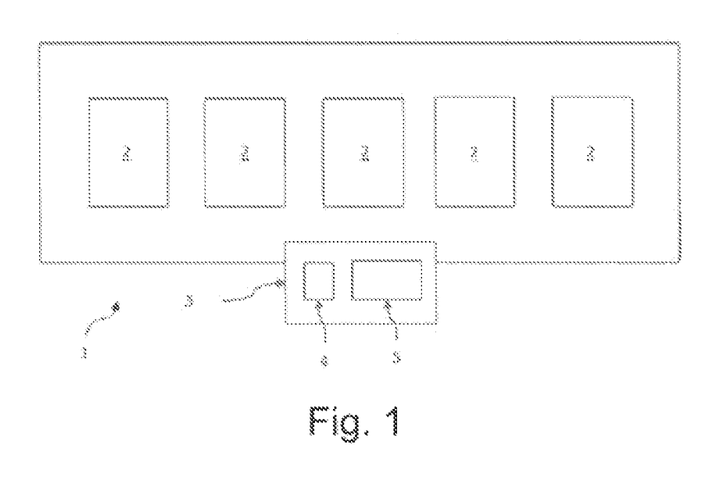
FIG. 1 a schematic presentation of the production machine according to the invention.

FIG. 1 shows a schematic presentation of the production machine for plastics processing according to the invention which comprises several machine components 2 (here five machine components such as e. g. a preheating station, a heating station, a moulding station, a cutting station and a stacking station of a thermoforming plant for deep-drawing mouldings from a heated plastic film web) and a machine control 3 for controlling the plastics processing machine 1. The machine control 3 comprises a control program 4 with an interactive user interface embodied as a visualization unit 5, preferably a touchscreen, the control program 3 being embodied to visually display on the visualization unit 5 at least one, preferably all, machine components 2 in their function during production in at least one presentation for each one of these machine components and to provide respective switch panels 51 for inputting process parameters relating to the respective visualized machine component 2. For details on the visualization unit 5, we refer to FIGS. 2-4. The control program 4 can be embodied such that visualization of the functions of the machine components 2 during production and input of process parameters into the respective switch panels 51 can be performed outside of real operation of the production machine 1. The control program 4 can provide a separate visualization page 55 on the visualization unit 5 for each visualized machine component 2, suitable switch panels 51 being provided for changing between individual visualization pages 55.

Figure 2:
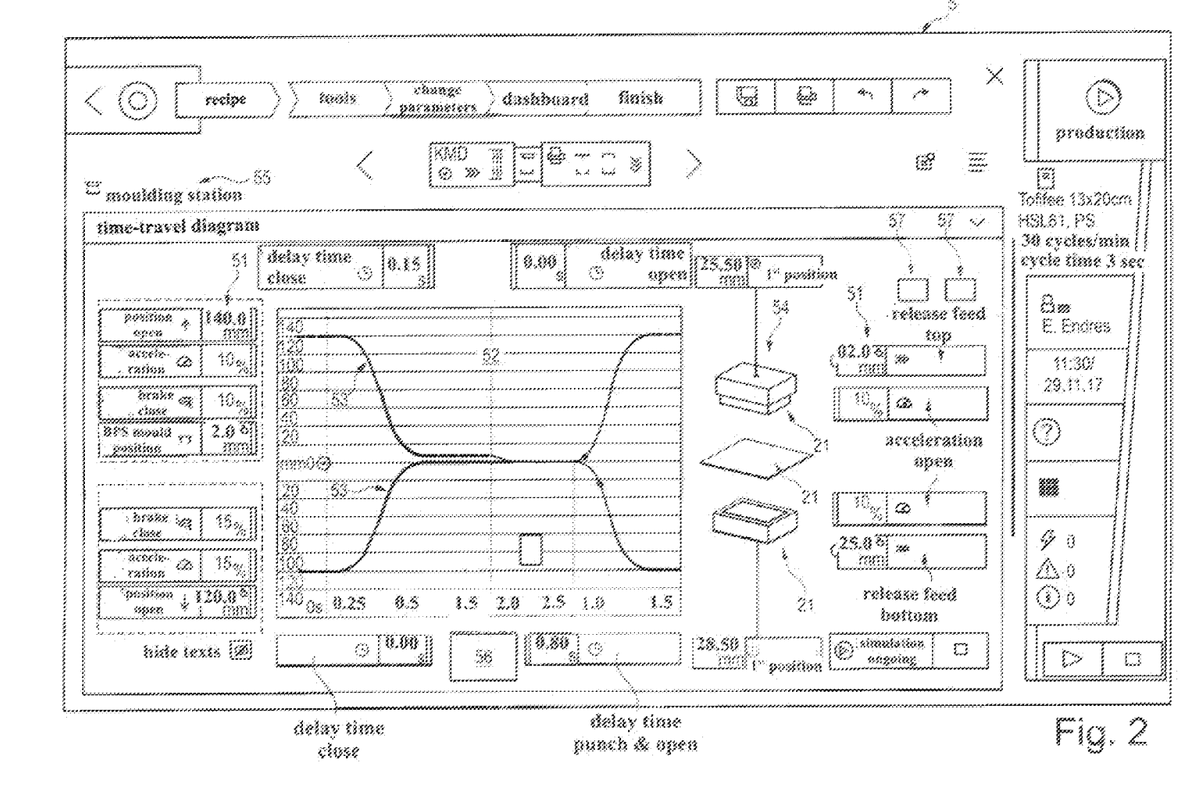
FIG. 2 an embodiment of the visualization of a machine component on the visualization unit according to the present invention.

FIG. 2 shows an embodiment of the visualization of a machine component 2 on the visualization unit 5 according to the present invention, where preferably all, here, as an example of a separate visualization page 55, the "moulding station" of a thermoforming machine, is visualized as a machine component 2, in their function during production in one presentation for each of these machine components and corresponding switch panels 51 for inputting process parameters with regard to the respective visualized machine component 2 are provided. The presentation here is a presentation of multiple factors and comprises a parameter-time diagram 52 with motion curves 53, in this case of three components 21 of the moulding station 2, namely the upper die 21, the lower die 21 and the film web 21 therebetween from which the moulding is to be formed subsequently. The moulding station 2 is shown here in the open state. The two motion curves 53 allocated to the upper and the lower die 21 are subdivided into differently visualized motion sections 53*a*, 53*b*, 53*c*, as explained in more detail in FIG. 3. Here, the parameter defining the process for this motion section 53*a*, 53*b*, 53*c* is visualized which can be varied by means of the provided switch panels 51. Also, the multi-factor presentation comprises, in addition to the parameter-time diagram 52, a FIG. 54 of the components of this machine component 2, in this case the moulding station, which correlates with the motion curves. The FIG. 54 of the components of the machine component takes the form of a three-dimensional perspective view of the components 21, where only those components 21 are shown which move in the parameter-time diagram 52 according to the motion curves 53. Also, FIG. 54 showing the components of the machine component by means of the control program 4 is arranged directly adjacent to the parameter-time diagram 52 to the right side thereof on the visualization unit 5. The switch panels 51 for inputting process parameters with influence on a specific motion curve 53 are arranged by the control program 4 separately from the other switch panels 51 with influence on the other motion curves 53 on the visualization unit 5. Here, the switch panels 51 with influence on specific motion curves 53 are arranged to the horizontal right and left of the parameter-time diagram 52 in several areas of the visualization unit 5 whereas switch panels 51 with a general influence on the motion curves 53 are arranged above and/or below the parameter-time diagram 52 on the visualization unit 5. The control program 4 further allows tracing of the motion curves 53 of the parameter-time diagram 52 on the visualization unit 5, the tracing being correlated with the accordingly moving presentation 54 of the components of the machine component in their respective positions at each point in time in the parameter-time diagram 52. The control program 4 is embodied such that the tracing can be adequately interrupted and continued by the operator at any point in time on the parameter-time diagram 52, with the moving presentation 54 of the components stopping at the position of the point in time when the tracing was interrupted, and accordingly continuing as of this position if tracing is resumed. For this purpose, the control program 4 provides a slider 56 on the visualization unit 5 by means of which the tracing of the parameter-time diagram 52 can be stopped, started, wound forward and backward and/or be performed in slow motion or in single steps with a corresponding correlated presentation 54 of the components.

In another embodiment not shown here, the visualization page "moulding station" could additionally show a pre-stretching die as further component 21 in the upper die 21 in the form of an additional motion curve 53 in the parameter-time diagram 52 and/or, additionally or alternatively to the upper and lower dies 21, in presentation 54. Thus, the separate visualization page 55 "moulding station" can comprise, in this alternative embodiment, additional switch panels in the form of switch tabs 57, a first switch tab 57 being allocated to the presentation of the upper and lower dies 21 in the parameter-time diagram 52 and/or in the presentation 54 and another switch tab 57 being assigned to the presentation of the pre-stretching die 21 in the parameter-time diagram 52 and/or in presentation 54. In this way, the movement of the pre-stretching die 21 with respect to the upper and lower dies 21 presented as tables could be visualized. By means of switch-tab switchover, it might be visualized that in the switch tab 57 for the upper and lower dies 21, optionally the pre-stretching die could be displayed in the parameter-time diagram 52 and/or in presentation 54. If the switch tab "pre-stretching die" is activated, optionally the upper and lower dies are shown.

Figure 3:
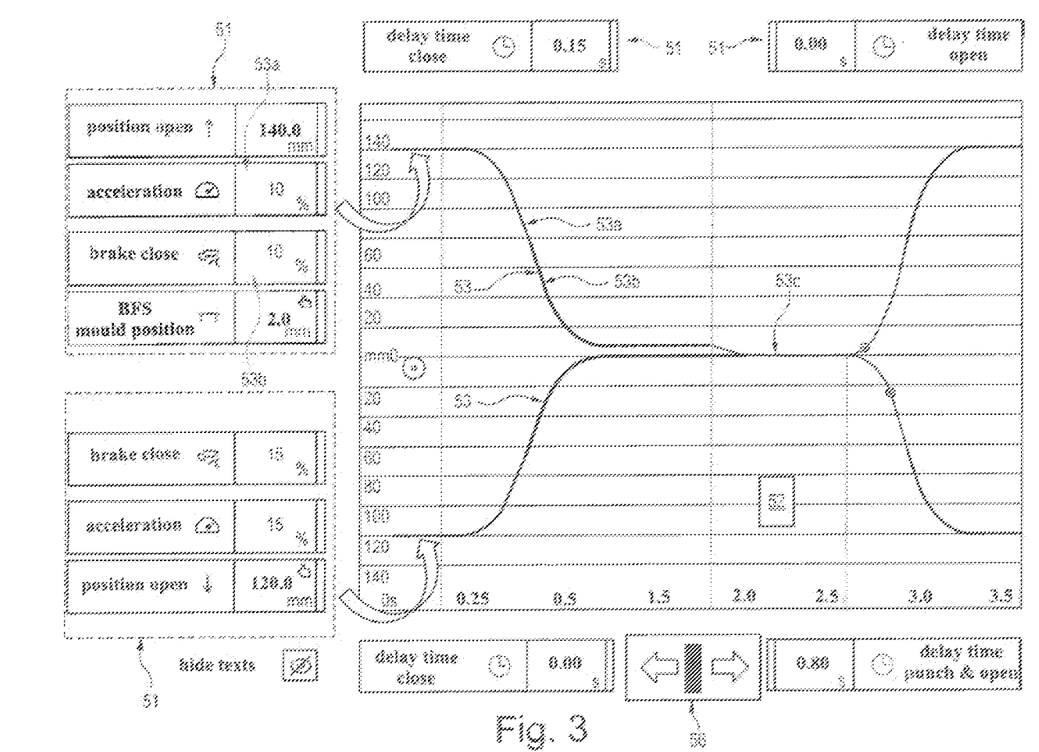
FIG. 3 a detail of FIG. 2 with the motion sections of the motion curves indicated.

FIG. 3 shows a detail of FIG. 2 with indicated motion sections 53*a*, 53*b*, 53*c* of the motion curves 53. Here, both motion curves 53 of the parameter-time diagram 52, which is here a time-travel diagram, are subdivided into different suitably visualized motion sections 53*a*, 53*b*, 53*c*. The motion sections 53*a*, 53*b*, 53*c* have a length depending on the process parameter input via the switch panels 51, with the control program 4 adapting the length of the motion sections 53*a*, 53*b*, 53*c* and the respective visualized process-defining parameter to the respective inputs. Here, the motion curves 53 are subdivided into the various motion sections 53*a*, 53*b*, 53*c* by means of different colors and the switch panels 51 of the process-defining parameters are indicated by the same colors as the corresponding motion sections 53*a*, 53*b*, 53*c* where these process parameters define the process. In addition, if the process-defining parameter is input via the respective switch panel 51, the corresponding motion section 53*a*, 53*b*, 53*c* is highlighted on the motion curve 53.

Figure 4:
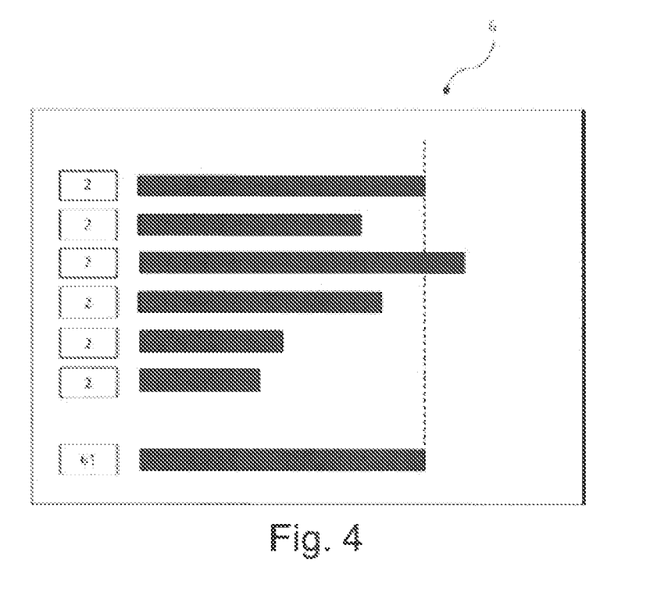
FIG. 4 a schematic presentation of a flowchart according to the present invention.

FIG. 4 shows a schematic presentation of a flowchart 6 according to the present invention. The control program 4 is adapted to calculate, from the motion curves 53 for the individual machine components 2, the flowchart 6 for the entire production machine 1 and to display it on the visualization unit 5 as a bar graph in separate lines allocated to the respective machine components 2. For this purpose, e. g. a desired length 61 (duration) of the overall process on the production machine 1 may be predefined such that it becomes clear from the flowchart which process or which machine component 2 must be optimized for the desired length 61 of the production process to be maintained.

Figure 5:
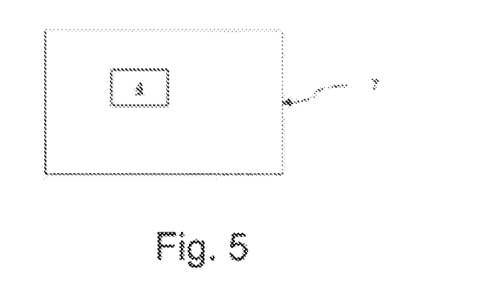
FIG. 5 a schematic presentation of a data carrier according to the invention with the control program according to the invention.

FIG. 5 shows a schematic presentation of a data carrier 7 according to the invention with the control program 4 according to the invention for executing the method according to the invention or for controlling the production machine according to the invention, respectively.

Figure 6:
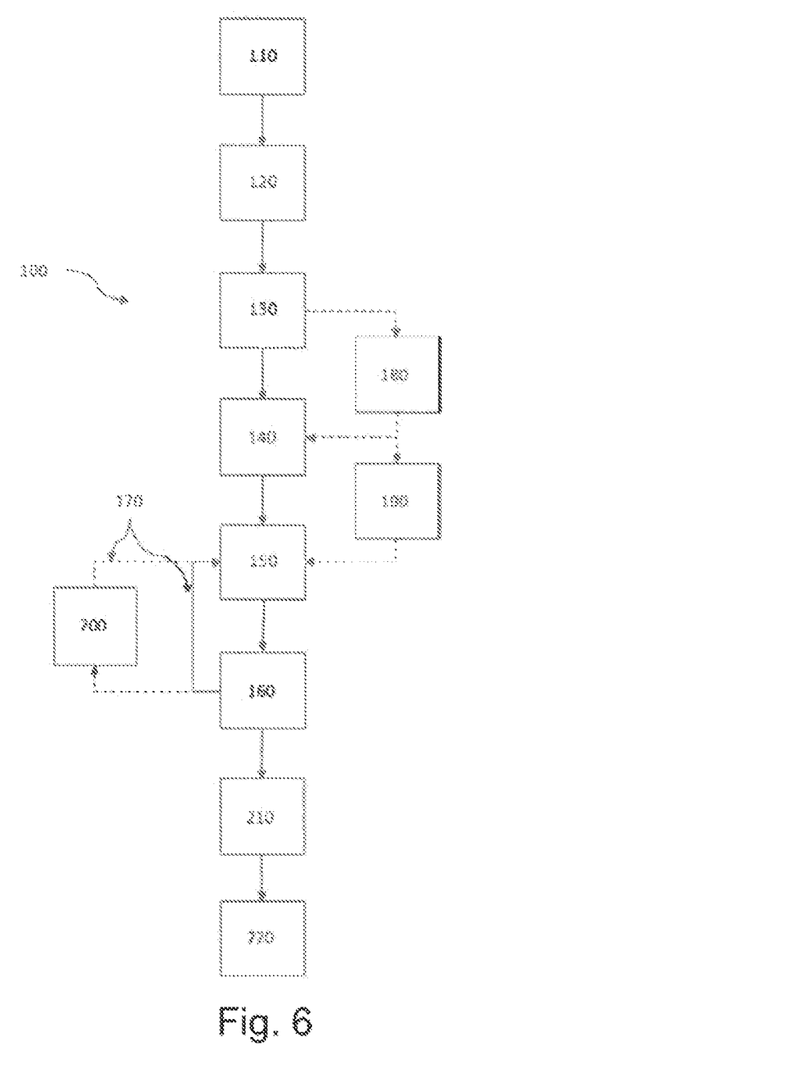
FIG. 6 an embodiment of the method of optimizing process parameters for a production machine according to the present invention.

FIG. 6 shows an embodiment of the method 100 for optimizing process parameters for a production machine 1 according to the present invention, comprising several machine components 2 and a machine control 3 for controlling the production machine 1, comprising a control program 4 with an interactive user interface embodied as a visualization unit 5, preferably a touchscreen; comprising the following steps of visualizing 110 at least one, preferably all, of the machine components 2 in their functions in production in a multi-factor presentation for each of these machine components 2 on the visualization unit 5 and providing corresponding switch panels 51 for inputting process parameters relating to the respective visualized machine component 2 by the control program 4, the multi-factor presentation comprising at least one parameter-time diagram 52 with motion curves 53 of one or more components 21 of the respective machine component 2 and a correlating presentation 54 of the components of this machine component; calculating 120 the motion curves based on the process parameters for the respective machine components 2 by the control program 4, the parameters being input via the switch panels 51 or already existing in the control program 4; subdividing 130 at least one of the motion curves 53 into different suitably visualized motion sections 53a, 53b, 53c by the control program 4; visualizing 140 the process-defining process parameter for the respective motion section 53a, 53b, 53c by the control program 4; varying 150 the process parameters via the switch panels 51 based on the visualized process-defining parameter for the respective motion sections 53a, 53b, 53c; adapting 160 the respective motion curves 53 on the basis of the varied process parameters by the control program 4 including visualization of the process-defining parameter for the respective motion section 53a, 53b, 53c by the control program 4; and repeating 170 the preceding steps for optimizing the process parameters for the production machine. Here, the motion sections 53a, 53b, 53c can have a length dependent on the parameters input via the switch panels 51 and the control program 4 adjusts 180 the length of the motion sections 53a, 53b, 53c and the respective visualized process-defining parameter to the respective inputs. The method 100 may further comprise the step of indicating 190 the switch panels 51 of the respective process-defining parameters by the same colors as the corresponding motion sections 53a, 53b, 53c, where these parameters are process-defining; the motion curves 53 being divided into the different motion sections 53a, 53b, 53c by means of different colors. The method 100 may further comprise the step of tracing 200 the motion curves 53 of the parameter-time diagram on the visualization unit 5 in correlation with the corresponding moving presentation 54 of the components of the machine component in their respective positions at each point in time in the parameter-time diagram 52. The method 100 may further comprise the additional steps of calculating 210 a flowchart 6 for the entire production machine 1 from the motion curves 53 for the individual machine components 2 and of displaying 220 the flowchart 6 on the visualization unit 5, preferably as a bar graph in separate lines allocated to the respective machine components 2. The method 100 of optimizing the process parameters for the production machine 1 may be performed by visualization of the machine components 2 in their functions in the production, and the input of process parameters into the respective switch panels 51 outside real operation of the production machine 1.

At this point, it is explicitly pointed out that features of the solutions described above or in the Claims and/or the Figures can also be combined, if desired, so as to be able to cumulatively arrive at or achieve features, effects and advantages explained.

It is understood that the example of embodiment explained above is merely a first embodiment of the present invention. Consequently, the embodiment of the invention is not limited to this example.

LIST OF REFERENCE NUMBERS 1 production machine, e. g. a thermoforming machine or a blow moulding machine
2 machine component(s)
21 component(s) of the machine component
3 machine control
4 control program
5 visualization unit
51 switch panel(s)
52 parameter-time diagram
53 motion curves
53a-c motion sections of the motion curves
54 presentation of components of the machine component
55 separate visualization page for each visualized machine component
56 slider for influencing the tracing of the motion curves
57 switch tabs
6 flow chart
61 desired length of processes
7 data carrier
100 method of optimizing process parameters for a production machine
110 visualization of at least some machine components
120 calculation of motion curves
130 subdividing the motion curve(s) into different suitably visualized motion sections
140 visualization of the process-defining process parameter for the respective motion section
150 varying of the process parameters via the switch panels
160 adjustment of motion curves on the basis of the varied process parameters
170 repetition of previous steps for optimization of the process parameters
180 adjustment of length of the motion sections
190 indication of the switch panels of the respective process-defining parameters
200 tracing the motion curves of the parameter-time diagram
210 calculating a flow chart for the entire production machine from the motion curves for the individual machine components
220 displaying the flow chart on the visualization unit

The invention claimed is:
1. A production machine for plastics processing, comprising several machine components and a machine control for controlling the plastics-processing machine, comprising a control program with an interactive user interface adapted as a visualization unit or a touchscreen;

the control program being adapted to visualize on the visualization unit at least one of the machine components in their functions in production in at least one presentation for each of these machine components, and to provide corresponding switch panels for inputting process parameters with respect to the visualized machine component;

the presentation comprising at least one parameter-time diagram with motion curves of one or more components of the respective machine component;

at least one of the motion curves being subdivided into different suitable visualized motion sections for each of which the process parameter defining the process for this motion section is visualized which can be varied via the provided switch panels;

the presentation is a multi-factor presentation comprising, in addition to the parameter-time diagram, a presentation of the components of these machine components which correlates with the motion curves, the control program allows tracing of the motion curves of the parameter-time diagram on the visualization unit, the tracing being correlated to the correspondingly moving presentation of the components of the machine component in their respective positions at any point in time in the parameter-time diagram, the control program is adapted such that the tracing process can suitably be interrupted and continued by the operator at any point in time on the parameter-time diagram, the moving presentation of the components stopping in the position of the point in time when tracing was interrupted, and correspondingly continuing as of this position when tracing is resumed.

2. The production machine according to claim 1, wherein all motion curves of the parameter-time diagram are subdivided into various suitably visualized motion sections.

3. The production machine according to claim 1, wherein the motion sections have a length dependent on the process parameters input via the switch panels, the control program adjusting the length of the motion sections and the respective visualized process-defining process parameter to the respective inputs.

4. The production machine according to claim 1, wherein the motion curves are subdivided into the different motion sections by means of different colors.

5. The production machine according to claim 4, wherein the switch panels of the respective process-defining process parameters are indicated by the same colors as the corresponding motion sections where these process parameters define the process.

6. The production machine according to claim 4, wherein when the process-defining process parameter is input via the respective switch panel, the corresponding motion section is highlighted on the motion curve.

7. The production machine according to claim 1, wherein the presentation of the components of the machine component is a three-dimensional perspective view of the components.

8. The production machine according to claim 1, wherein in the presentation of the components of the machine component, only those components are shown which move in accordance with the motion curves in the parameter-time diagram.

9. The production machine according to claim 1, wherein the presentation of the components of the machine component is arranged by the control program directly adjacent to the parameter-time diagram on the visualization unit.

10. The production machine according to claim 1, wherein the switch panels for inputting process parameters which have an influence on a specific motion curve are arranged by the control program separately from the other switch panels with influence on the other motion curves on the visualization unit.

11. The production machine according to claim 10, wherein the switch panels with influence on specific motion curves are arranged in one or more areas on the visualization unit horizontally next to the parameter-time diagram whereas switch panels with a general influence on the motion curves are arranged on the visualization unit above and/or below the parameter-time diagram.

12. The production machine according to claim 1, wherein the control program provides a separate visualization page on the visualization unit for each visualized machine component, suitable switch panels being provided for changing between individual visualization pages.

13. The production machine according to claim 1 wherein the control program is adapted such that the visualization of the machine components in their functions can be performed during production and the input of process parameters into the respective switch panels without real operation of the production machine.

14. The production machine according to claim 1, wherein the control program is adapted to display on at least one of the separate visualization pages switch tabs allocated to the individual components of the machine component visualized by the visualization page, by means of which optionally another component, in addition to the presentation of the component allocated to the respective switch tab, can be highlighted as an additional motion curve into the parameter-time diagram and/or into the presentation of the other components.

15. The production machine according to claim 1, wherein the control program provides a slider on the visualization unit by means of which tracing of the parameter-time diagram can be stopped, started, wound forward and backward and/or performed in slow motion or in single steps with a correspondingly correlated presentation of the components.

16. The production machine according to claim 1, wherein the control program is adapted to calculate from the motion curves for the individual machine components a flowchart for the entire production machine and display it on the visualization unit as a bar graph in separate lines assigned to the respective machine components.

17. Method of optimizing process parameters for a production machine comprising several machine components and a machine control for controlling the production machine, comprising a control program with an interactive user interface embodied as a visualization unit or a touchscreen; comprising the following steps:

visualizing at least one of the machine components in their functions in production in a multi-factor presentation for each of these machine components on the visualization unit and providing corresponding switch panels for inputting process parameters relating to the respective visualized machine component by the control program, the multi-factor presentation comprising at least one parameter-time diagram with motion curves of one or more components of the respective machine component and a correlating presentation of the components of this machine component;

calculating the motion curves based on the process parameters for the respective machine components by the control program, the parameters being input via the switch panels or already existing in the control program;

subdividing at least one of the motion curves into different suitably visualized motion sections by the control program;

visualizing the process-defining process parameter for the respective motion section by the control program;

varying the process parameters via the switch panels based on the visualized process-defining process parameter for the respective motion sections;

adapting the respective motion curves on the basis of the varied process parameters by the control program including visualization of the process-defining process parameter for the respective motion section by the control program; and repeating the preceding steps for optimizing the process parameters for the production machine.

18. The method according to claim 17, the method of optimizing the process parameters for the production machine being performed by visualization of the machine components in their functions in the production, and the input of process parameters into the respective switch panels outside real operation of the production machine.

19. The method according to claim 17, comprising the additional steps of
    calculating a flowchart for the entire production machine from the motion curves for the individual machine components; and
    displaying the flowchart on the visualization unit as a bar graph in separate lines allocated to the respective machine components.

20. The method according to claim 17, where the motion sections have a length dependent on the process parameters input via the switch panels and the control program adjusts the length of the motion sections and the respective visualized process-defining process parameter to the respective inputs.

21. The method according to claim 17, comprising the further step of indicating the switch panels of the respective process-defining process parameters by the same colors as the corresponding motion sections, where these parameters are process-defining; the motion curves being divided into the different motion sections by means of different colors.

22. The method according to claim 17, comprising the further step of tracing the motion curves of the parameter-time diagram on the visualization unit in correlation with the corresponding moving presentation of the components of the machine component in their respective positions at each point in time in the parameter-time diagram.

* * * * *